United States Patent [19]

Tressler

[11] Patent Number: 5,239,838
[45] Date of Patent: Aug. 31, 1993

[54] HEATING AND COOLING SYSTEM HAVING AUXILIARY HEATING LOOP

[76] Inventor: Steven N. Tressler, 1121 Franklin St., Montoursville, Pa. 17754

[21] Appl. No.: 762,440

[22] Filed: Sep. 19, 1991

[51] Int. Cl.⁵ ............................................. F25B 13/00
[52] U.S. Cl. .................... 62/324.1; 237/2 B; 62/235.1; 62/238.7
[58] Field of Search ............... 62/324.1, 235.1, 324.6, 62/238.6, 238.7; 237/2 B

[56] References Cited

U.S. PATENT DOCUMENTS

| | | | |
|---|---|---|---|
| 2,764,876 | 10/1956 | Parcaro | 62/324.1 |
| 2,779,171 | 1/1957 | Lindenblad | 62/324.1 |
| 2,847,834 | 8/1958 | Atchison | 62/324.1 |
| 3,188,829 | 6/1965 | Siewert et al. | 62/324.1 |
| 4,179,894 | 12/1979 | Hughes | 62/2 |
| 4,190,199 | 2/1980 | Cawley et al. | 126/419 |
| 4,409,796 | 10/1983 | Fisher | 62/324.1 |

FOREIGN PATENT DOCUMENTS 3720558  1/1989  Fed. Rep. of Germany ..... 62/235.1

*Primary Examiner*—Albert J. Makay
*Assistant Examiner*—William C. Doerrler
*Attorney, Agent, or Firm*—Leon Gilden

[57] ABSTRACT

An apparatus and method for exchanging heat energy between a refrigeration circuit and a hot water system utilizes a solar heated water tank or a conventional water heater. In a wintertime operation, condensed refrigerant receives heat from either the solar heated water tank or the water heater and the additional heat is delivered to living spaces by an indoor condenser and fan assembly. In summertime operation, condensed refrigerant bypasses the hot water storage arrangement so as to function as a normal air conditioning system.

2 Claims, 1 Drawing Sheet

HEATING AND COOLING SYSTEM HAVING AUXILIARY HEATING LOOP

BACKGROUND OF THE INVENTION

1. Field of the Invention

The present invention relates to a refrigeration system and more particularly pertains to the transferring of heat energy between a refrigeration circuit and a hot water system.

2. Description of the Prior Art

It is known to combine a refrigeration system and hot water heating system so as to effect a transference of heat energy therebetween. For example, U.S. Pat. No. 4,293,093, which issued to Raymond et al on Oct. 6, 1981, discloses a refrigeration system and hot water heating arrangement wherein the superheat of the refrigerant is rejected to water to be heated such that this heat energy may be utilized to provide hot water. In effect, the Raymond et al device teaches the capturing of waste heat from a refrigerant and the subsequent use of the heat for a useful intended purpose. However, there are presently no commercially available systems which employ the opposite concept, i.e., the supplying of heat to a refrigerant so as to enhance its operation as a heat pump or the like.

Accordingly, it can be appreciated that there exists a continuing need for new and improved refrigeration arrangements which employ the use of excess heat to enhance a refrigeration cycle, both during winter and summer operation. In this regard, the present invention fulfills this need.

SUMMARY OF THE INVENTION

In view of the foregoing disadvantages inherent in the known types of refrigeration systems now present in the prior art, the present invention provides an improved refrigeration cycle construction wherein the same can be utilized as a pump during winter operation in a much more effective manner through the supplying of additional heat energy from a hot water storage system. As such, the general purpose of the present invention, which will be described subsequently in greater detail, is to provide a new and improved refrigeration apparatus and method which has all the advantages of the prior art refrigeration apparatuses and methods and none of the disadvantages.

To attain this, the present invention relates to an apparatus and method for exchanging heat energy between a refrigeration circuit and a hot water system which utilizes a solar heated water tank or a conventional water heater. In a wintertime operation, condensed refrigerant receives heat from either the solar heated water tank or the water heater and the additional heat is delivered to living spaces by an indoor condenser and fan assembly. In summertime operation, condensed refrigerant bypasses the hot water storage arrangement so as to function as a normal air conditioning system.

It is therefore an object of the present invention to provide a new and improved refrigeration apparatus which has all the advantages of the prior art refrigeration apparatuses and none of the disadvantages.

It is another object of the present invention to provide a new and improved refrigeration apparatus which may be easily and efficiently manufactured and marketed.

It is a further object of the present invention to provide a new and improved refrigeration apparatus which is of a durable and reliable construction.

An even further object of the present invention is to provide a new and improved refrigeration apparatus which is susceptible of a low cost of manufacture with regard to both materials and labor, and which accordingly is then susceptible of low prices of sale to the consuming public, thereby making such refrigeration apparatuses economically available to the buying public.

Still yet another object of the present invention is to provide a new and improved refrigeration apparatus which provides in the apparatuses and methods of the prior art some of the advantages thereof, while simultaneously overcoming some of the disadvantages normally associated therewith.

Still another object of the present invention is to provide a new and improved refrigeration apparatus which can be more effectively employed as a heat pump during wintertime operation through the addition of excess heat energy obtained from a hot water storage system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawing wherein.

DESCRIPTION OF THE PREFERRED EMBODIMENT

Figure 1:
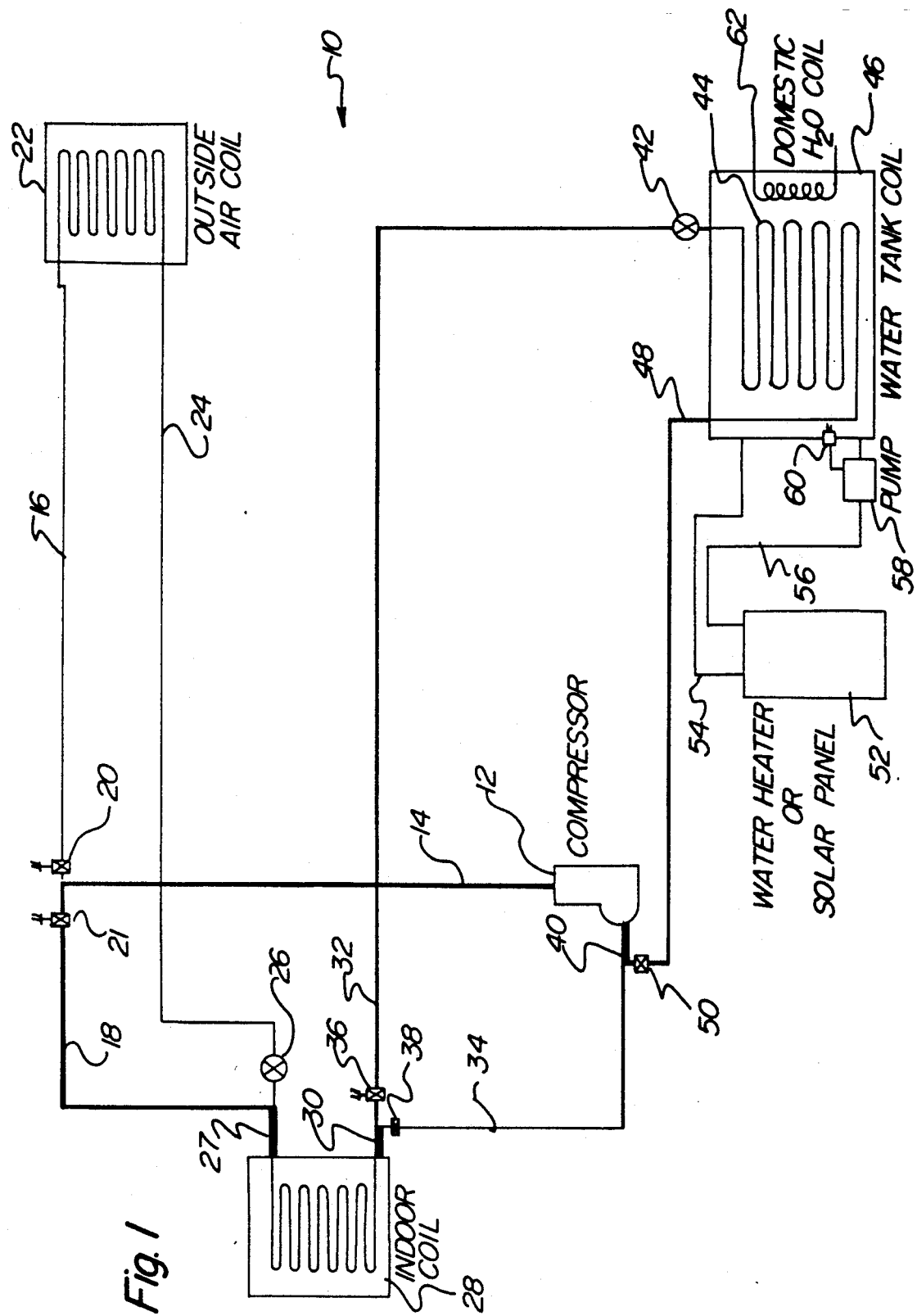
FIG. 1 is a schematic representation of the refrigeration apparatus comprising the present invention.

With reference now to the drawing, and in particular to FIG. 1 thereof, a new and improved refrigeration system embodying the principles and concepts of the present invention and generally designated by the reference numeral 10 will be described.

More specifically, it will be seen that the refrigeration system 10 includes a conventional refrigerant compressor 12 having a discharge conduit 14 which branches into a pair of conduits 16, 18. A first hot gas solenoid valve 20 is positioned in the conduit 16, and a second hot gas solenoid valve 21 is positioned in the conduit 18. The conduit 16 operates as a refrigerant intake to an outdoor air to air coil assembly 22 which effects a heat exchange with the use of a conventional fan assembly. A discharge conduit 24 is integrally attached to the coil assembly 22 and directs refrigerant away from the coil to an expansion valve 26 where the refrigerant passes to an intake conduit 27 associated with an interiorly positioned evaporator coil 28. The aforementioned conduit 18 also branches downwardly to the intake conduit 27 downstream of the aforementioned expansion valve 26.

A discharge conduit 30 leading away from the evaporator coil 28 branches into a pair of conduits 32, 34. A liquid line solenoid valve 36 is positioned in the conduit 32 while a second liquid line solenoid valve 38 is positioned in the conduit 34. The conduit 34 is in fluid communication with an intake conduit 40 associated with the refrigerant compressor 12, and the conduit 32 is directed to an expansion valve 42 positioned before a further evaporator coil 44 which is retained within a water storage tank 46. A discharge conduit 48 forming a portion of the coil 44 attaches through a T-connection to the compressor intake conduit 40, and a one way check valve 50 prevents a reverse flow of refrigerant from the compressor intake conduit for a purpose which will be subsequently described in greater detail.

With respect to the construction of the hot water storage tank 46, the same may be in fluid communication with the hot water heater 52 from which a water supply conduit 54 is directed to the storage tank, and a water return line 56 is directed therefrom. A pump 58 may be positioned in the water return line 56 positioned between the water storage tank 46 and the hot water heater 52, while an aquastat 60 may be employed in a conventional manner to control the operation of the pump. Additionally, a domestic hot water coil 62 may be positioned within the hot water storage tank 46 and may be directed to another source of heat energy to effect a heating thereof, such as the use of a remotely positioned solar collector or the like.

The novelty of the present invention will be better understood from a discussion relating to the operation of the system associated therewith. In this regard, certain components of the system 10 are utilized only during summertime operation while other components are reserved for an exclusive use during wintertime operation.

With respect to the summertime operation of the system, a flow of liquid refrigerant moves from the compressor 12 through conduit 14 and through hot gas solenoid valve 20. The refrigerant, which is of a high temperature due to the retained heat of condensation, passes through the intake conduit 16 into the outdoor air to air coil assembly 22. Excess heat is removed from the coil by the propeller fan assembly associated therewith, and a low temperature liquid refrigerant is then delivered to the conduit 24 in a now apparent manner. The low temperature liquid refrigerant is allowed to flash into a gas when passing through the expansion valve 26 and the gas then absorbs heat from the surrounding spaces within the evaporator coil assembly 28. At the same time, the gas achieves a low pressure state common of all gases and the low temperature low pressure gas then passes through the liquid line solenoid valve 38 and from there through the conduit 34 back to the compressor 12 to be compressed into a high pressure high temperature gas once again. This effectively defines the summertime operation of the invention.

With respect to the wintertime operation of the invention, the flow of high pressure high temperature liquid refrigerant is from the compressor 12 to the indoor coil 28 by means of passing though the hot gas solenoid valve 21 and its downstream conduit 18. A squirrel cage fan will move air across the indoor coil 18, which now functions as a condenser as opposed to an evaporator during summer use, and as such, warm air is delivered to the surrounding living spaces. The lower temperature liquid refrigerant will then flow to the water storage tank 46 where a further expansion valve 42 will cause the liquid refrigerant to flash into a gas and absorb heat from the water contained within the tank. The low pressure low temperature gas then goes back to the compressor 12 to be recompressed into a high pressure high temperature gas and the cycle repeats itself. The one way check valve 50 prevents a reverse flow of refrigerant within the evaporator coil 44 and also prevents refrigerant from moving through the coil during the summertime cycle use of the system.

The water temperature within the water storage tank 46 is maintained between 90 to 40 degrees fahrenheit. When the water temperature reaches the low temperature, i.e., 40 degrees fahrenheit, the water heater 52 and/or the domestic hot water coil 62 can be used to raise the water temperature back to a higher setting. In this regard, the aquastat 60 will sense the decrease in water temperature and function to operate the pump 58 which delivers the cooled water to the hot water heater 52 from whence it is heated and returned by means of conduit 54 to the storage tank 46.

As can be appreciated, the advantages of the present invention include the elimination of the need for defrosting, no dependence on outdoor temperature, and adaptability within a conventional in place air conditioning system.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved heating and cooling system comprising:
   a first loop comprising a compressor, an outside air heat exchanger, first expansion means, and a condenser connected in series to facilitate the flow of a refrigerant therethrough,
   conduit means connected between said compressor and said condenser adapted to cause said refrigerant to bypass said outside air heat exchanger, first valve means in said conduit means operable between a first condition to cause said refrigerant to flow through said outside air heat exchanger and said first expansion means and a second condition to cause said refrigerant to bypass said outside heat exchanger and said first expansion means and flow via said conduit means directly through said condenser from said compressor,
   a second loop comprising second expansion means, a second heat exchanger, and one-way valve means connected in series between said condenser and said compressor of said first loop, said second heat exchanger adapted to transfer heat to said refrigerant as said refrigerant flows between said second expansion means and said one-way valve, and
   second valve means connected between said first loop and said second loop, said second valve means being operable between first and second conditions whereby said refrigerant is caused to flow directly from said condenser to said compressor thereby bypassing said second loop in said first condition and through said second expansion means, said second heat exchanger, and said one-way valve of said second loop in said second condition such that heat from said second heat exchanger is transferred to the refrigerant flowing through said second loop and said condenser functions as an evaporator effective to transfer heat from said refrigerant to the air outside thereof when said first and second valve means are in their second conditions respectively;

wherein said second heat exchanger comprises a coil mounted in a storage tank, and means for circulating heated water through said storage tank from an external source, and wherein said external source comprises a domestic hot water heater.

2. The heating and cooling system of claim 1, wherein said external source comprises a solar hot water heater.

* * * * *